United States Patent
Dhanabalan et al.

(10) Patent No.: US 10,158,575 B2
(45) Date of Patent: Dec. 18, 2018

(54) SYSTEM FOR BANDWIDTH OPTIMIZATION WITH HIGH PRIORITY TRAFFIC AWARENESS AND CONTROL

(71) Applicant: Citrix Systems, Inc., Fort Lauderdale, FL (US)

(72) Inventors: Praveen Raja Dhanabalan, Tamil Nadu (IN); Chaitra Maraliga Ramaiah, Karnataka (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 368 days.

(21) Appl. No.: 14/742,264

(22) Filed: Jun. 17, 2015

(65) Prior Publication Data
US 2016/0373361 A1 Dec. 22, 2016

(51) Int. Cl.
*H04L 12/26* (2006.01)
*H04L 12/851* (2013.01)
*H04L 12/801* (2013.01)
*H04L 12/825* (2013.01)
*H04L 12/807* (2013.01)
*H04L 12/841* (2013.01)
*H04L 12/835* (2013.01)

(52) U.S. Cl.
CPC ............. *H04L 47/24* (2013.01); *H04L 47/11* (2013.01); *H04L 47/25* (2013.01); *H04L 47/27* (2013.01); *H04L 47/283* (2013.01); *H04L 47/30* (2013.01)

(58) Field of Classification Search
CPC ....... H04L 47/125; H04L 47/19; H04L 47/24; H04L 47/2416; H04L 47/27
USPC .......................................................... 370/230
See application file for complete search history.

(56) References Cited

U.S. PATENT DOCUMENTS

| | | | | |
|---|---|---|---|---|
| 7,099,273 | B2 * | 8/2006 | Ha | H04L 1/1887 370/229 |
| 7,760,638 | B2 * | 7/2010 | Shimonishi | H04L 1/187 370/235 |
| 7,778,164 | B2 * | 8/2010 | Shimonishi | H04L 1/1874 370/229 |
| 7,802,008 | B2 * | 9/2010 | Akinlar | H04L 47/10 709/235 |
| 8,374,091 | B2 * | 2/2013 | Chiang | H04L 43/0829 370/236 |
| 9,014,264 | B1 * | 4/2015 | Cheng | H04L 12/2647 375/240.05 |
| 2003/0063564 | A1 * | 4/2003 | Ha | H04L 12/5692 370/230 |

(Continued)

*Primary Examiner* — Dmitry Levitan
(74) *Attorney, Agent, or Firm* — Fox Rothschild LLP; Robert J. Sacco; Carol E. Thorstad-Forsyth

(57) ABSTRACT

An appliance for optimizing network traffic is described. The appliance includes a transport layer controller configured to acquire link characteristics of a link, determine a congestion window for a flow of a plurality of data packets over the link, and determine transport layer characteristics for the flow. The appliance also includes a traffic priority controller configured to acquire a flow priority of the flow, determine whether congestion is or going to occur using the transport layer characteristics and the link characteristics, and increase the congestion window for the flow based on the congestion determination and on the flow priority having been indicated as being higher priority. The appliance further includes a quality of service engine configured to output the flow according to the congestion window.

21 Claims, 9 Drawing Sheets

(56) References Cited

U.S. PATENT DOCUMENTS

| | | | |
|---|---|---|---|
| 2008/0225715 A1* | 9/2008 | Plamondon | H04L 1/0025 370/232 |
| 2012/0106342 A1* | 5/2012 | Sundararajan | H04L 47/193 370/235 |
| 2015/0236966 A1* | 8/2015 | Francini | H04L 47/27 370/235 |

* cited by examiner

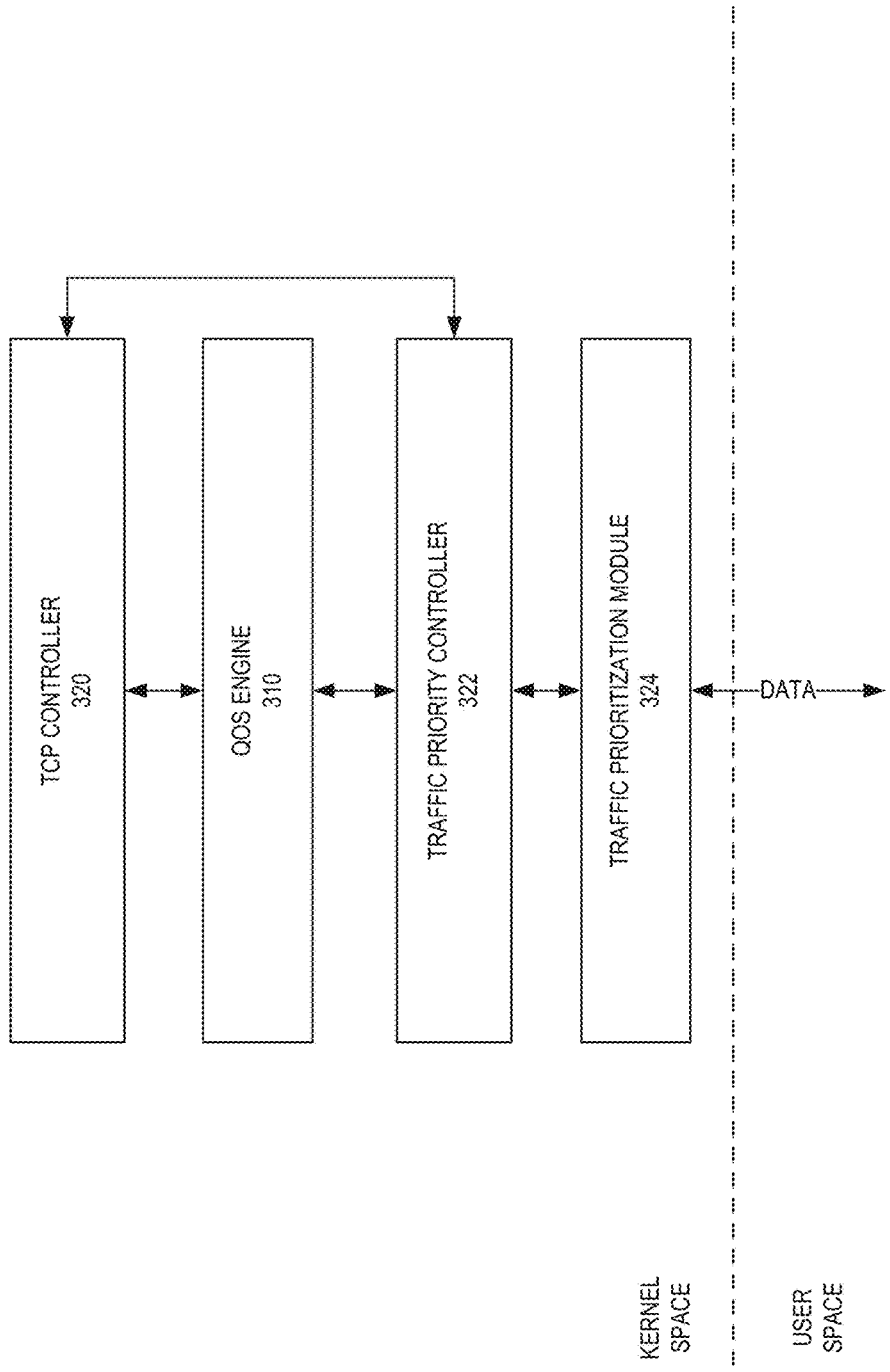

| PRIORITY 710 | cwnd 440 | CALCULATION FOR $cwnd_{modified}$ 720 | $cwnd_{modified}$ 470 |
|---|---|---|---|
| P1 | 100 | Cwnd*(1+0.6) | 160 |
| P2 | 100 | Cwnd*(1+0.3) | 130 |
| P3 | 100 | Cwnd*(1+0.15) | 115 |
| P4 | 100 | Cwnd*(1) | 100 |
| P5 | 100 | Cwnd*(1) | 100 |
| P6 | 100 | Cwnd*(1) | 100 |

SYSTEM FOR BANDWIDTH OPTIMIZATION WITH HIGH PRIORITY TRAFFIC AWARENESS AND CONTROL

BACKGROUND

A middlebox is a network appliance that manipulates Internet traffic by optimizing data flow across the network. Middleboxes can be configured as wide area network ("WAN") optimizers and can be deployed in pairs across two geographically separated locations to optimize data traffic between the two middleboxes. Middleboxes can proxy the TCP connections by monitoring the transmission control protocol (TCP) connection on a first link (LAN) and forming a new TCP connection (the proxied TCP connection) on second link (WAN) based on the connection on the first link. Middleboxes can be connected through a single link or multiple links such as a leased line link and a broadband link. Middleboxes use TCP congestion avoidance algorithms, commonly called "TCP flavors," to optimize TCP data flows as part of a quality of service ("QoS") scheme. Common examples of TCP avoidance flavors can include algorithms such as TCP Vegas, TCP Reno, TCP NewReno, TCP Hybla, TCP BIC, and TCP CUBIC, among others. Each TCP congestion avoidance flavor is suited for optimizing data flows originating from or received by particular operating systems, link types, and/or other network characteristics.

Some TCP flavors improve quality of service across TCP connections by using congestion control and congestion avoidance techniques that sometimes include TCP traffic prioritization. Traffic prioritization, a traffic shaping technique for Quality of Service (QoS), can ensure that more packets from high priority (P1) traffic are pushed into the network for increased throughput. Thus when there are enough data, to be sent from both P1 and non-high priority (non-P1) traffic, the prioritization functionality of QoS can push more packets from P1 traffic into the network pipe thereby delivering better throughput and providing enhanced QoS for P1 traffic. For example, using conventional methods of prioritization, if traffic prioritization module dictates 3:1 ratio for P1 and non-P1 traffic, we could expect approximately 75% of the packets occupying the leased network pipe to be of P1 traffic.

One down side of conventional prioritization techniques is when the overall traffic on the network link becomes scarce, the QoS module, which works with the traffic prioritization module, does not receive enough P1 traffic to induce drastic P1 throughput increases regarding the overall traffic volume. Using conventional traffic prioritization techniques, without the TCP controller being aware of the number of P1 packets, P1 traffic may be constrained to a predefined proportion of the TCP flow based on the overall low traffic volume, when greater P1 throughput could he achieved by enhanced P1 traffic management.

SUMMARY

In some aspects, an appliance for optimizing network traffic is described. The appliance includes a transport layer controller configured to acquire link characteristics of a link, determine a congestion window for a flow of a plurality of data packets over the link, and determine transport layer characteristics for the flow. The appliance also includes a traffic priority controller configured to acquire a flow priority of the flow, determine whether congestion is or going to occur using the transport layer characteristics and the link characteristics, and increase the congestion window for the flow based on the congestion determination and on the flow priority having been indicated as being higher priority if there is no congestion for the flow. The appliance further includes a quality of service engine configured to output the flow according to the congestion window.

In another aspect, a method for optimizing network traffic is described. The method can include acquiring link characteristics of a link determining a congestion window for a flow of a plurality of data, packets over the link, determining transport layer characteristics for the flow, assigning a flow priority of the flow, determining whether congestion is occurring or is going to occur using the transport layer characteristics and the link characteristics, and responsive to determining that there is no congestion for the flow, increasing the congestion window for the flow based on the congestion determination and on the flow priority having been indicated as being higher priority.

In yet another aspect, non-transitory computer readable storage medium is described. The storage medium stores a set of instructions that are executable by at least one processor of an appliance to cause the appliance to perform a method for optimizing network traffic. The method can include acquiring link characteristics of a link determining a congestion window for a flow of a plurality of data packets over the link, determining transport layer characteristics for the flow, assigning a flow priority of the flow, determining whether congestion is occurring or is going to occur using the transport, layer characteristics and the link characteristics, and responsive to determining that there is no congestion for the flow, increasing the congestion window for the flow based on the congestion determination and on the flow priority having been indicated as being higher priority.

BRIEF DESCRIPTION OF THE DRAWINGS

Reference will now be made to the accompanying drawings showing example embodiments of this disclosure. In the drawings:

FIG. 3B is a block diagram of a portion of an exemplary appliance illustrated in FIG. 3A, consistent with embodiments of the present disclosure.

FIG. 7 is a table representing an exemplary implementation of a modified flow, consistent with embodiments of the present disclosure.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein provide TCP network bandwidth optimization with high priority traffic awareness and control. The prioritization of TCP network traffic can avoid or mitigate network congestion for higher priority traffic and improve the efficiency of the network data flow through optimization of the bandwidth.

Figure 1:
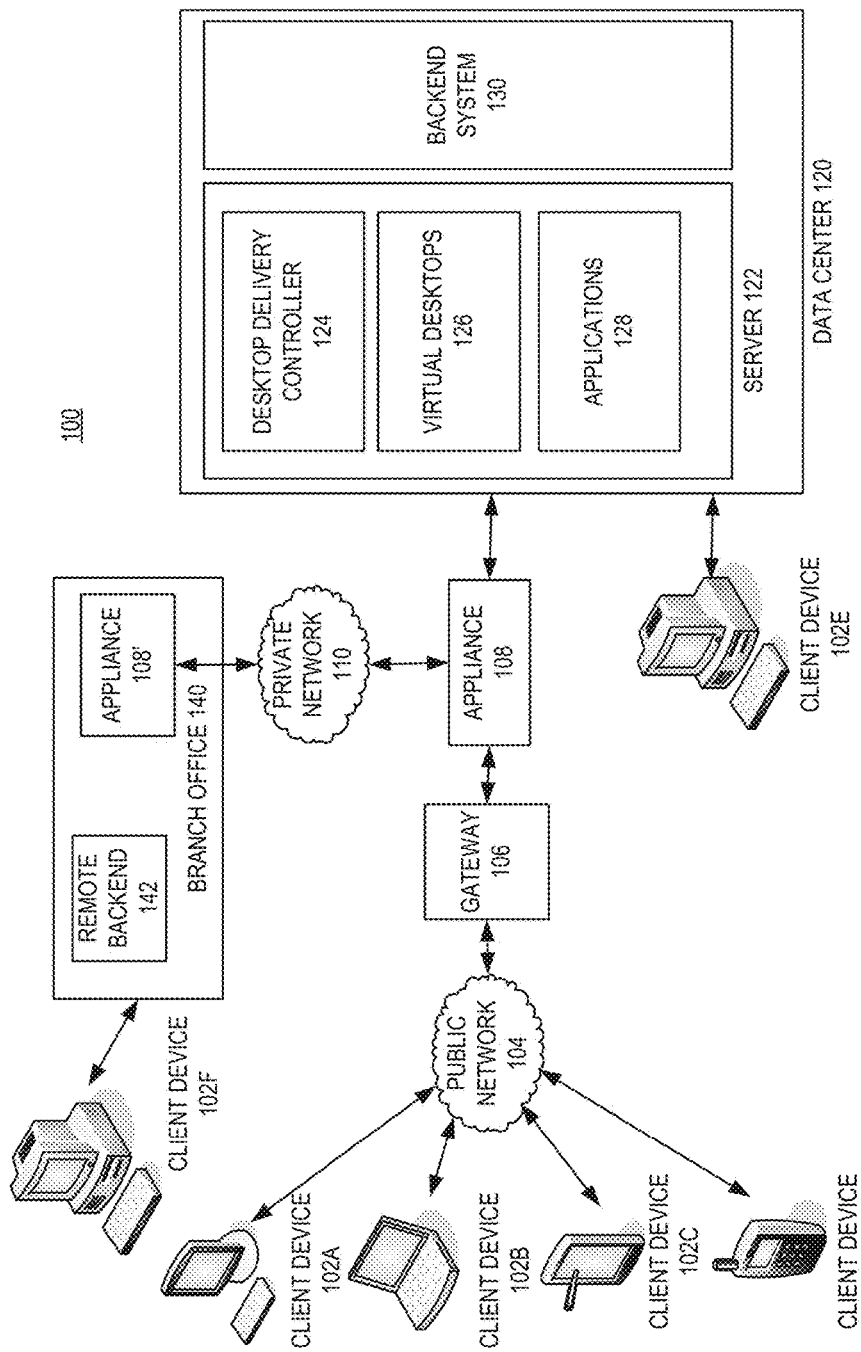
FIG. 1 is a block diagram of an exemplary network environment, consistent with embodiments of the present disclosure.

FIG. 1 is a block diagram of an exemplary network environment 100. While exemplary network environment 100 is directed to a virtual network environment, it is appreciated that the network environment can be any type of network that communicates using packets. Network environment 100 can include one or more client devices 102, a public network 104, a gateway 106, an appliance 108, a private network 110, a data center 120, and a branch office 140.

One or more client devices 102 are devices that can acquire remote services from data center 120 through various means. Client devices 102 can communicate with a data center 120 either directly (e.g., client device 102e) or indirectly through a public network 104 (e.g., client devices 102a-d) or a private network 110 (e.g., client device 102f). When client device 102 communicates through public network 104 or private network 110, a communication link can be established. For example, a link can be established by public network 104, gateway 106, and appliance 108, thereby providing a client device (e.g. client devices 102a-d) access to data center 120. A link can also be established by branch office 140 including appliance 108', private network 110, and appliance 108, thereby providing a client device (e.g. client device 102f) access to data center 120. While client devices 102 are portrayed as a computer (e.g., client devices 102a, 102e, and 102f), a laptop (e.g., client device 102b), a tablet (e.g., client device 102c), and a mobile smart, phone (e.g., client, device 102d), it is appreciated that client device 102 could be any type of device (e.g., wearable or smart, watch) that communicates packets to and from data center 120.

Public network 104 and private network 110 can be any type of network such as a wide area network (WAN), a local area network (LAN), or a metropolitan area network (MAN). As an example, a WAN can be the Internet or the World Wide Web, and a LAN can be a corporate Intranet. Public network 104 and private network 110 can be a wired network or a wireless network.

Gateway 106 is a physical device or is software that is part of a physical device that interfaces between two networks having different protocols. Gateway 106, for example, can be a server, a router, a host, or a proxy server. In some embodiments, gateway 106 can include or be coupled to a firewall separating gateway 106 from public network 104 (e.g., Internet). Gateway has the ability to modify signals received from client device 102 into signals that appliance 108 and/or data center 120 can understand and vice versa.

Appliance 108 is a device that optimizes wide area network (WAN) traffic by including, for example, a quality of service ("QoS") engine. In some embodiments, appliance 108 optimizes other types of network traffic, such as local area network (LAN) traffic, metropolitan area network (MAN) traffic, or wireless network traffic. Appliance 108 can optimize network traffic by, for example, scheduling data packets in an established communication link so that the data packets can he transmitted or dropped at a scheduled time and rate. In some embodiments, appliance 108 is a physical device, such as Citrix System's ByteMobile™, Netscaler™, or CloudBridge™. In some embodiments, appliance 108 can be a virtual appliance. In some embodiments, appliance can be a physical device having multiple instances of virtual machines (e.g., virtual Branch Repeater). In some embodiments, a first appliance (e.g., appliance 108) works in conjunction with or cooperation with a second appliance (e.g., appliance 108') to optimize network traffic. For example, the first appliance can be located between the WAN and a corporate LAN (e.g., data center 120), while the second appliance can be located between a branch office (e.g., branch office 140) and a WAN connection. In some embodiments, the functionality of gateway 106 and appliance 108 can be located in a single physical device. Appliances 108 and 108' can be functionally the same or similar. Moreover, in some embodiments, appliance 108 and gateway 106 can be part of the same device. Appliance 108 is further described below corresponding to FIG. 3A.

Data center 120 is a central repository, either physical or virtual, for the storage, management, and dissemination of data and information pertaining to a particular public or private entity. Data center 120 can be used to house computer systems and associated components, such as one or more physical servers, virtual servers, and storage systems. Data, center 120 can include, among other things, one or more servers (e.g., server 122) and a backend system 130. In some embodiments data, center 120 can include gateway 106, appliance 108, or a combination of both.

Server 122 is an entity represented by an IP address and can exist as a single entity or a member of a server farm. Server 122 can be a physical server or a virtual server. In some embodiments, server 122 can include a hardware layer, an operating system, and a hypervisor creating or managing one or more virtual machines. Server 122 provides one or more services to an endpoint. These services include providing one or more applications 128 to one or more endpoints (e.g., client devices 102a-f or branch office 140). For example, applications 128 can include Microsoft Windows™-based applications and computing resources.

Desktop delivery controller 124 is a device that enables delivery of services, such as virtual desktops 126 to client devices (e.g., client devices 102a-f or branch office 140). Desktop delivery controller 124 provides functionality required to manage, maintain, and optimize all virtual desktop communications.

In some embodiments, the services include providing one or more virtual desktops 126 that can provide one or more applications 128. Virtual desktops 126 can include hosted shared desktops allowing multiple user to access a single shared Remote Desktop Services desktop, virtual desktop infrastructure desktops allowing each user to have their own virtual machine, streaming disk images, a focal virtual machine, individual applications (e.g., one or more applications 128), or a combination thereof.

Backend system 130 is a single or multiple instances of computer networking hardware, appliances, or servers in a server farm or a bank of servers and interfaces directly or indirectly with server 122. For example, backend system 130 can include Microsoft Active Directory™, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle™ backend server, a SQL Server backend, and/or a dynamic host configuration protocol (DHCP). Backend system 130 can provide data, services, or a combination of both to data center 120, which can then provide that information via varying forms to client devices 102 or branch office 140.

Branch office 140 is part of a local area network (LAN) that is part of the WLAN having data center 120. Branch office 140 can include, among other things, appliance 108' and remote backend 142. In some embodiments, appliance 108' can sit between branch office 140 and private network 110. As stated above, appliance 108' can work with appliance 108. Remote backend 142 can be set up in similar manner as backend system 130 of data center 120. Client device 102f can be located on-site to branch office 140 or can be located remotely from branch office 140.

Appliances 108 and 108' and gateway 106 can be deployed as or executed on any type and form of specific computing device (e.g., such as the computing device of FIGS. 2A-2B) capable of communicating on any type and form of network described herein. Appliances 108 and 108' can be deployed individually or as a pair operatively connected together.

Figure 2A:
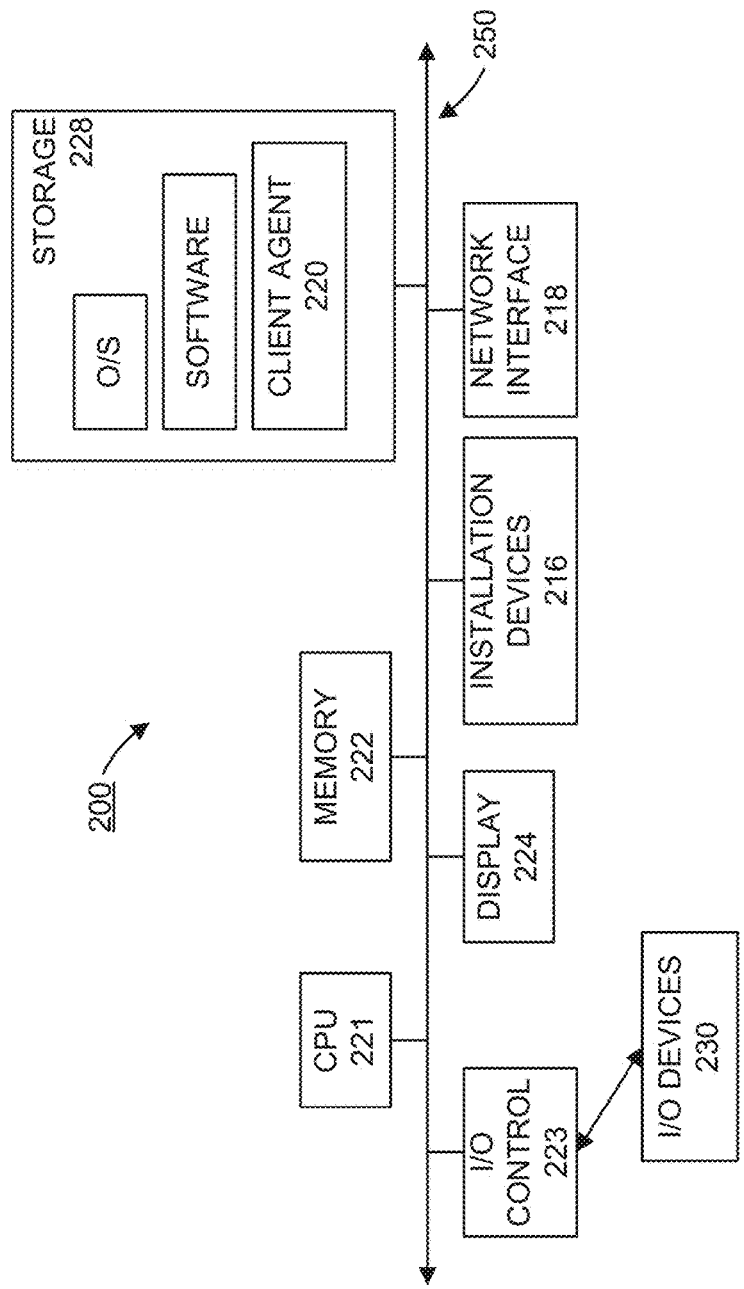
FIGS. 2A-2B are block diagrams of an exemplary computing device, consistent with embodiments of the present disclosure.
Figure 2B:
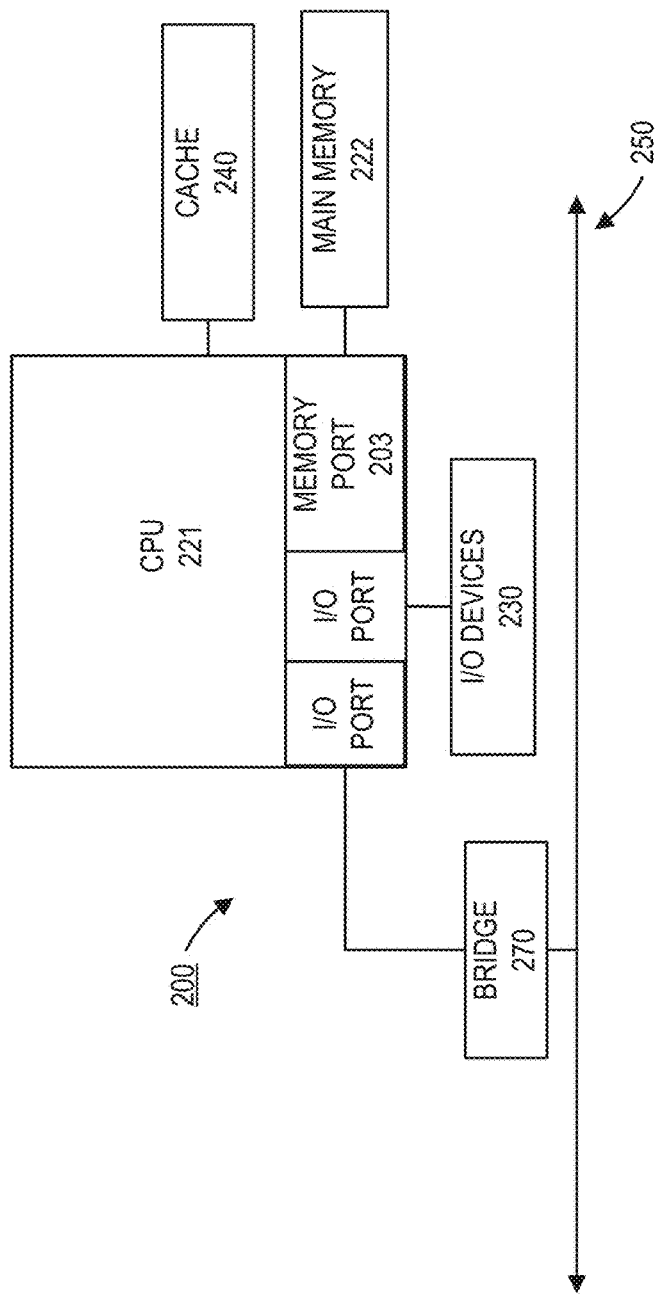

As shown in FIGS. 2A-2B, each computing device 200 includes a central processing unit (CPU) 221 and a main memory 222. CPU 221 can be any logic circuitry that responds to and processes instructions fetched from the main memory 222. CPU 221 can be a single or multiple microprocessors, field-programmable gate arrays (FPGAs), or digital signal processors (DSPs) capable of executing particular sets of instructions stored in a memory (e.g., main memory 222) or cache (e.g., cache 240). The memory includes a tangible and/or non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), flash drive, flash memory, registers, caches, or a semiconductor memory. Main memory 222 can be one or more memory chips capable of storing data and allowing any storage location to be directly accessed by CPU 221. Main memory 222 can be any type of random access memory (RAM), or any other available memory chip capable of operating as described herein. In the exemplary embodiment shown in FIG. 2A, CPU 221 communicates with main memory 222 via a system bus 250. Computing device 200 can also include a visual display device 224 and an input/output (I/O) device 230 (e.g., a keyboard, mouse, or pointing device) connected through I/O controller 223, both of which communicate via system bus 250. One of ordinary skill in the art would appreciate that CPU 221 can also communicate with memory 222 and other devices in manners other than through system bus 250, such as through serial communication manners or point-to-point communication manners. Furthermore, I/O device 230 can also provide storage and/or an installation medium for the computing device 200.

FIG. 2B depicts an embodiment of an exemplary computing device 200 in which CPU 221 communicates directly with main memory 222 via a memory port 203. CPU 221 can communicate with a cache 240 via a secondary bus (not shown), sometimes referred to as a backside bus. In some other embodiments, CPU 221 can communicate with cache 240 via system bus 250. Cache 240 typically has a faster response time than main memory 222. In some embodiments, such as the embodiment shown in FIG. 2B, CPU 221 can communicate directly with I/O device 230 via an I/O port (not shown). In further embodiments, I/O device 230 can be a bridge 270 between system bus 250 and an external communication bus, such as a USB bus, an Apple Desktop Bus, an RS-232 serial connection, a SCSI bus, a FireWire™ bus, a Fire Wire 800™ bus, an Ethernet bus, an AppleTalk™ bus, a Gigabit Ethernet bus, an Asynchronous Transfer Mode bus, a HIPPI bus, a Super HIPPI bus, a SerialPlus bus, a SCI/LAMP bus, a FibreChannel™ bus, or a Serial Attached small computer system interface bus, or some other type of data bus.

As shown in FIG. 2A, computing device 200 can support any suitable installation device 216, such as a disk drive or other input port for receiving one or more computer-readable media such as, for example, a USB device, flash drive, SD memory card; a hard-drive; or any other device suitable for installing software and programs such as any client agent 220, or portion thereof. Computing device 200 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, computing device 200 can include a network interface 218 to interface to a LAN, WAN, MAN, or the Internet through a variety of link including, but not limited to, standard telephone lines, LAN or WAN links (e.g., 802.11, T1, T3, 56 kb, X.25), broadband link (e.g., ISDN, Frame Relay, ATM), wireless connections (Wi-Fi, Bluetooth, Z-Wave, Zigbee), or some combination of any or all of the above. Network interface 218 can comprise a built-in network adapter, network interface card, PCMCIA network card, card bus network adapter, wireless network adapter, USB network adapter, modem or any other device suitable for interfacing computing device 200 to any type of network capable of communication and performing the operations described herein.

Figure 3A:
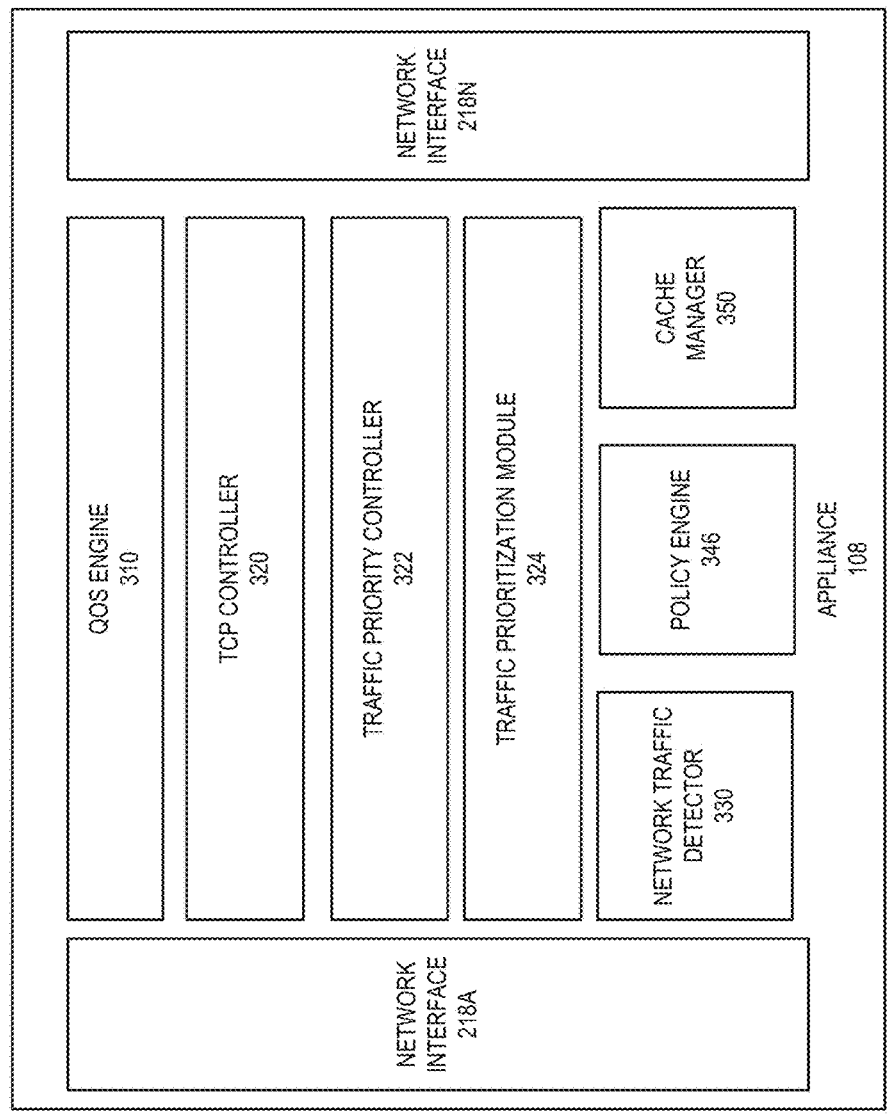
FIG. 3A is a block diagram of an exemplary appliance illustrated in FIG. 1, consistent with embodiments of the present disclosure.

FIG. 3A is a block diagram of an exemplary appliance 108 and/or 108' illustrated in FIG. 1, consistent with embodiments of the present disclosure. Appliance 108 can include one or more network interfaces 218A-N consistent with network interface 218 of FIG. 2A, a QoS engine 310, one or more TCP controllers 320, one or more traffic priority controllers 322, one or more network traffic detectors 330, a policy engine 346, and a cache manager 350. Although FIG. 3A depicts network interfaces 218A-218N as two network interfaces, it is appreciated that interfaces 218A-218N can include any number of network interfaces.

QoS engine 310, which is also referred to as a "QoS controller," or a "QoS packet scheduler," can perform one or more optimization (e.g., Quality of Service "QoS") techniques, including the application of one or more TCP traffic prioritization algorithms, etc. QoS engine 310 can be one or more modules, which can be one or more packaged functional software and/or hardware units designed for use with other components or a part of a program that performs a particular function (e.g., optimization techniques), corresponding to the particular step, of related functions. QoS engine 310 can be configured to improve the performance, operation, or quality of service of any type of network traffic. QoS engine 310 performs these techniques, for example, by using defined logic, business rules, functions, or operations. In some embodiments, QoS engine 310 can perform network traffic optimization and management mechanisms that provide different priorities to different users, applications, flows, or links. QoS engine 310 can also control, maintain, or assure a certain level of performance to a user, application, flow, or connection. QoS engine 310 can direct TCP controller 320 to perform any or all steps for determining one or more congestion windows using one or more TCP characteristics and TCP traffic priority. For example, QoS engine 310 can control, maintain, prioritize and/or assure a certain portion of bandwidth or network capacity of a communication link for a user, application, one or more flows, or links, collect data in connection with one or more flows and links, analyze the collected data, select a TCP flavor suitable for avoiding TCP traffic congestion on the one or more flows. QoS engine 310 can observe traffic behaviors and user behaviors, and based on the traffic and user behaviors, determine relative priorities of traffic.

In some embodiments, QoS engine 310 can monitor the achieved level of performance or the quality of service (e.g., the data rate, delay, dropped packets, etc.) corresponding to a user, application, and/or flow, or link, and then dynamically control or adjust one or more TCP characteristics in connection with sending and receiving data packets to achieve the desired level of performance or quality of service. QoS engine 310 can direct TCP controller 320 to perform some or all of the steps according to exemplary embodiments disclosed herein. For example, QoS engine 310 can coordinate the acquisition and delivery of TCP characteristics between traffic priority controller 322 and TCP controller 320, QoS engine 310 can also coordinate the acquisition and delivery of link characteristics between components of appliance 108, such as, for example, between network traffic detector 330, TCP controller 320, traffic prioritization module 324, and traffic priority controller 322.

TCP controller 320, which is also referred to as a "packet engine," a "packet processor," or a "data processor," is responsible for controlling and managing the processing of data packets received and transmitted by appliance 108 via network interfaces 218A-N. TCP controller 320 can be one or more modules, which can be one or more packaged functional hardware units designed for use with other components or a part of a program that performs a particular function (e.g., controlling and managing the processing of data packets), corresponding to the particular step, of related functions. TCP controller 320 can be embodied as a single packet engine or any number of a plurality of packet engines that can operate at the data link layer (layer 2), network layer (layer 3), or the transport layer (layer 4) of a network stack (e.g., such as the layers and protocols of the Open System Interconnection communications model). TCP controller 320 can be configured to accomplish some or all of the steps described herein after being executed by CPU 221 and/or QoS engine 310. In some aspects, the data packets can be carried over the data link layer via the Ethernet communication protocol, which can comprise any of the family of WAN or LAN protocols, such as those protocols covered by the IEEE 802.3. In other aspects, the network stack can have any type and form of wireless protocols, such as IEEE 802.11 and/or mobile internet protocols. In some embodiments, TCP controller 320 intercepts or receives data packets at the network layer, such as via the IP communication protocol. In some embodiments, TCP controller 320 can intercept or receive data packets at the transport layer, such as via the TCP communication protocols. TCP controller 320 can operate at any session or any application layer above the transport layer.

TCP controller 320 can include a buffer for queuing one or more data packets during processing of the data packets. Additionally, TCP controller 320 can communicate via one or more communication protocols to transmit and receive a plurality of network data packets across one or more links via network interfaces 218A-N. The links can connect appliance 108 to appliance 108', TCP controller 320 can be configured to acquire data, regarding the flow and store, the acquired data, in an operatively connected computer memory. The sent and received data packets operating across one or more links can be considered "data flows" or "flows." In some embodiments, TCP controller 320 can send scheduling requests to QoS engine 310 for scheduling of data packets received and stored at TCP controller 320. After TCP controller 320 receives responses from QoS engine 310, TCP controller 320 processes the stored data packets according to their scheduled priorities determined by QoS engine 310, traffic prioritization module 324, and/or traffic priority controller 322. TCP controller 320 can determine one or more TCP characteristics of the flow based on the stored data. A TCP characteristic, as discussed in further detail below, includes a plurality of information such as, for example, packet round trip times and/or the packet loss rate for a particular data flow, an average bandwidth delay product for the packets sent and received across a particular link, congestion window drop information, and/or other congestion window information such as current congestion window size, among other things.

During operations of appliance 108, TCP controller 320 can interface, be integrated with, or be in communication with any portion of appliance 108, such as QoS engine 310, traffic priority controller 322, traffic priority controller 322, network traffic detector 330, policy engine 346, and/or cache manager 350. As such, any of the logic, functions, or operations of QoS engine 310, traffic priority controller 322, traffic prioritization module 324, network traffic detector 330, policy engine 346, and/or cache manager 350 can be performed in conjunction with or in responsive to TCP controller 320. TCP controller can be controlled by and/or execute any operation described herein.

In some aspects, one or more traffic priority controllers 322 can be configured to send and receive flow information from TCP controller 320, and/or QoS engine 310. Traffic priority controller 322 can be configured to acquire one or more TCP characteristics from TCP controller 320, acquire one or more flow priorities from traffic prioritization module 324, and determine a congestion window size based on the TCP characteristics and the one or more flow priorities. Because the flow characteristics change with time during the high priority (first priority) congestion window determination process, the selection is said to be "dynamic." TCP characteristics can include one or more characteristics that change with time, such as, for example, packet round trip times and/or the packet loss rate for a particular data flow, an average queuing delay for the packets sent and received across a particular link, and/or congestion window information. Traffic priority controller 322 can be one or more modules, which can be one or more packaged functional hardware units designed for use with other components or a part of a program that performs a particular function (e.g., controlling and managing the processing of data packets), corresponding to the particular step, of related functions.

Traffic prioritization module 324 can determine one or more relative priorities for each TCP flow. Traffic prioritization module 324 works in conjunction with QoS engine 310 to observe relative priorities of TCP flows, and assign new TCP priorities based on observed behavior and/or predetermined priority rules. Traffic prioritization module 324 can be one or more modules, which can be one or more packaged functional hardware units designed for use with other components or a part of a program that performs a particular function (e.g., optimization techniques), corresponding to the particular step, of related functions.

One or more network traffic detectors 330 can include any logic, business rules, functions, or operations for automatically detecting the type of network traffic corresponding to data packets acquired by TCP controller 320. Network traffic detector 330 can be one or more modules, which can be one or more packaged functional hardware units designed for use with other components or a part of a program that performs a particular function (e.g., acquire one or more link characteristics), corresponding to the particular step, of related functions. As described above, TCP controller 320 can store and transmit data packets from any type of network traffic, such as data packets from any communication protocols including WAN, MAN, LAN, and wireless communication protocols. In some embodiments, not all network traffic is optimized by QoS engine 310. For example, QoS engine 310 can be used to optimize the WAN traffic, but not the LAN traffic or traffic directed to management. Network traffic detector 330 can detect the type of network traffic received at TCP controller 320 by any available techniques, such as by using IP addresses. Network traffic detectors 330 can also determine a link type, a bandwidth, and/or other characteristics associated with one or more flows.

Appliance 108 can also include a policy engine 346, also referred to as a policy controller or a policy provider. Policy engine 346 can include any logic, function, or operations for providing and applying one or more policies or rules to the function, operation, or configuration of any portion of the appliance 108. Policy engine 346 can be one or more modules, which can be one or more packaged functional hardware units designed for use with other components or a part of a program that performs a particular function, corresponding to the particular step, of related functions. In some embodiments, policy engine 346 provides a configuration mechanism to allow a user to identify, specify, define, or configure a policy for appliance 108, or any portion thereof. For example, policy engine 346 can provide a predefined traffic optimization configuration policy including the number of priorities, the priorities associated with each service class, the number of connections allowed under each service class, link bandwidth configuration, and any other policy information. Policy engine 346 can also provide policies for what data to cache, when to cache the data, for whom to cache the data, when to expire an object in cache, or when to refresh the cache. Policy engine 346 can also include any logic, rules, functions, or operations for determining and providing access, control, and management of data packets received and stored by TCP controller 320. Policy engine 346 can also include any logic, rules, functions, or operations for determining and providing access, control and management of security, network traffic, network access, compression, or any other function or operation performed by appliance 108.

Cache manager 350 can include software, hardware, or any combination of software and hardware to store data, information, and objects to a cache in memory or storage; to provide cache access; and to control and manage the cache. The data, objects, or content processed and stored by cache manager 350 can include data in any format, such as a six-byte MAC address, a TCP data packet, or any type of data communicated via any communication protocol. Examples of types of data can include, for example, one or more TCP characteristics including information in connection with packet loss rates, queuing delays, flow congestion, sizes of congestion windows, bandwidth of one or more links, average round trip times, etc. Cache manager 350 can duplicate original data stored in a slow-access storage and store the data in a fast-access cache memory, such as cache 240. After the data is stored in the cache, future use can be made by accessing the cached copy rather than refetching or recomputing the original data, thereby reducing the access time. In some embodiments, the cache can comprise a data object in memory of appliance 108. In some embodiments, the cache can comprise any type and form of storage element of appliance 108, such as a portion of a hard disk. In some embodiments, as described above, the processing unit of the device, such as CPU 221, can provide cache memory for use by cache manager 350. Cache manager 350 can use any portion and combination of main memory 222, storage 228, or CPU 221 for caching data, objects, and other content. Cache manager 350 can comprise any type of general purpose processor (GPP), or any other type of integrated circuit, such as a Field Programmable Gate Array (FPGA), Programmable Logic Device (PLD), or Application Specific Integrated Circuit (ASIC). Cache manager 350 can be one or more modules, which can be one or more packaged functional hardware units designed for use with other components or a part of a program that performs a particular function, corresponding to the particular step, of related functions.

FIG. 3B is a block diagram of a portion of exemplary appliance 108 illustrated in FIG. 3A, consistent with embodiments of the present disclosure. In some embodiments, the operating system of appliance 108 allocates, manages, or otherwise segregates the available system memory into what is referred to as kernel space (system space) and user space (application space). The kernel space is typically reserved for running the kernel, including any device drivers, kernel extensions, or other kernel related software. The kernel can be the core of the operating system, and provides access, control, and management of resources and hardware-related elements of the appliance 108. In some aspects, the kernel space can also include a number of network services or processes working in conjunction with QoS engine 310, TCP controller 320, traffic priority controller 322, traffic prioritization module 324, or any portion thereof. Additionally, the embodiments of the kernel can depend on the operating system installed, configured, or otherwise used by appliance 108.

Figure 4:
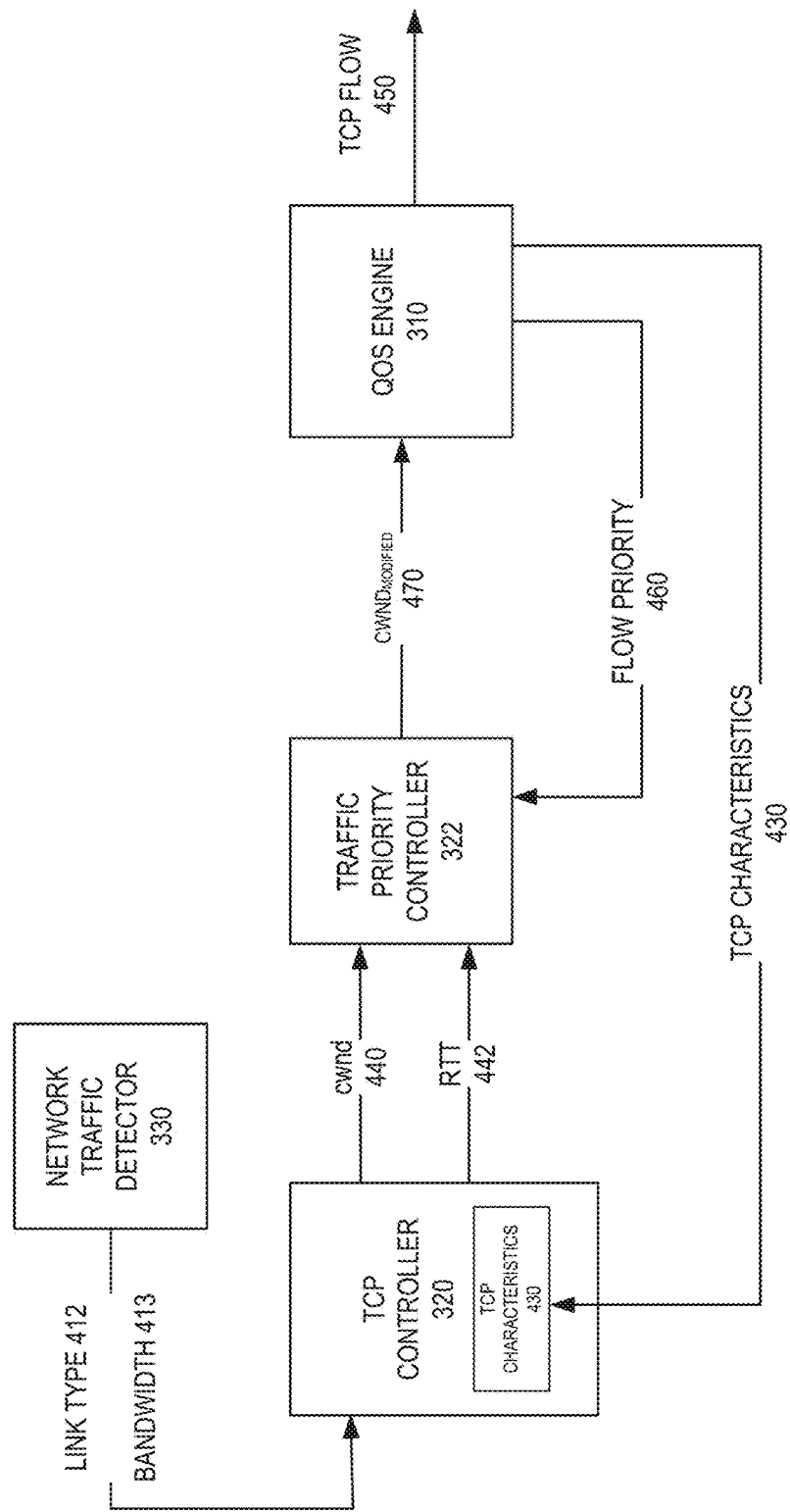
FIG. 4 is a block diagram of an exemplary embodiment for determining a modified higher priority congestion window, consistent with embodiments of the present disclosure.

User space is the memory area or portion of the operating system used by user mode applications or programs otherwise running in user mode. A user mode application cannot access kernel space directly and uses service calls to access kernel services. The operating system uses the user space for executing or running applications and provisioning of user level programs, services, processes, and/or tasks. As an example, the operating system can execute software of network interfaces 218A-N in the user space. FIG. 4 is a block diagram of an exemplary embodiment for determining an initial congestion window 440 (hereinafter "congestion window 440"), consistent with embodiments of the present disclosure. Traffic priority controller 322 can be configured to receive both static input and dynamic input, and use both inputs to determine congestion window 440. Static input can include one or more TCP link characteristics that include information regarding one or more links across which one or more flows 450 are operating. Examples of a TCP link characteristic can include bandwidth information (e.g., bandwidth 413), link type (e.g., link type 412), and/or the number of active TCP connections, among other things, between two link terminals (e.g., between appliance 108 and appliance 108'). TCP characteristics 430 can also include dynamically-changing information in connection with packet loss rates, queuing delays, flow congestion, sizes of congestion windows, average round trip times, and/or other information in connection with active flow 450. A flow is "active" when packets are being sent and received across a TCP link, In TCP connections, the congestion window is one of the factors used to determine the number of bytes that can be outstanding in an active flow at a given time. Congestion windows are also a means of stopping a link between two link terminals from being overloaded with too much traffic. The congestion window size can be determined by estimating how much TCP packet congestion there is between the two link terminals. The data sender generally maintains and determines the congestion window size. According to some embodiments, an intelligent feedback system providing high priority traffic awareness can provide enhanced throughput and QoS for very high priority (P1) traffic during network congestion.

Referring now to FIG. 4, an exemplary traffic priority controller 322 can be configured to control the congestion window size of proxied TCP connections based on flow priority and dynamically-changing TCP characteristics. The TCP characteristics can be derived empirically from a sampled list of previously seen long-lived TCP links by recording the congestion related parameters for each sampled flow. In some aspects, appliance 108 can improve network speed, efficiency and quality of service by determining a congestion window that avoids packet loss of high priority traffic due to traffic congestion. TCP characteristics can also be derived empirically from observing relative priorities of the transmitted data.

Traffic priority controller 322 can acquire feedback signals from QoS engine 310. Traffic priority controller 322 can control the congestion window of the first priority TCP traffic by inflating the congestion window in a controlled way to inject an optimum number of first priority packets into the flow, while taking into account the level of overall congestion in the link. For example, traffic priority controller 322 can inflate the congestion window only when there is no congestion for first priority traffic. By inflating congestion window for first priority (P1) traffic, appliance 108 can achieve better throughput and quality of service for P1 flows, which is more optimal than other lesser priority traffic.

According to some embodiments, traffic priority controller 322 can predict congestion in the leased line links. In some aspects, for every P1 flow detected by traffic priority controller 322 having no congestion, appliance 108 can systematically increase the congestion window size of a P1 connection.

In some aspects, TCP controller 320 is configured to send and receive a plurality of data packets via a flow operating across a leased line link, and store flow information indicative of various operational aspects of the flow in an operatively connected computer memory (e.g., main memory 222). TCP controller 320 can determine one or more link characteristics using link information (e.g., link type 412 and/or bandwidth 413), and determine one or more TCP characteristics for the flow using the flow information and link characteristics.

According to some embodiments, one or more processors (e.g., CPU 221) can execute TCP controller 320. TCP controller 320 can then acquire and/or evaluate TCP characteristics 430 (which are dynamically changing over time), receive static input (which does not change over time), and select congestion window 440 based on the static input and/or dynamic input. For example, traffic priority controller 322 can acquire one or more TCP characteristics 430, acquire one or more link characteristics (e.g., link type 412 and/or bandwidth 413) from network traffic detector 330, and determine congestion window 440 based on the acquired inputs. TCP controller 320 can forward initial first priority control window 440 to traffic priority controller 322. Appliance 108 can also forward other TCP characteristics to traffic priority controller 322, such as, for example, round trip time 442. Traffic priority controller 322 can acquire flow priority 460 from QoS engine 310, and determine a size for modified first priority congestion window 470 based on the flow priority 460, TCP characteristics 430, and link congestion (not shown), as determined by TCP controller 320. According to some embodiments, QoS engine 310 can process TCP flow 450 and route the flow to its destination.

In some aspects, TCP controller 320 can continually monitor the traffic for a predetermined period of time, and continually provide dynamic feedback to traffic priority controller 322. Although a predetermined period of time can vary based on application, it is contemplated that TCP controller 320 can monitor traffic for periods of several seconds to periods of time spanning several minutes before calculating TCP characteristics 430.

Using link characteristics (e.g., link type 412 and bandwidth 413) and TCP characteristics 430, appliance 108 can estimate the amount of first priority (P1) data that could be pushed to the network when the connection starts without causing congestion, and better gain of throughput for each first priority flow while being TCP fair to other flows operating across the active links. When there is no imminent congestion in the network, by increasing congestion window 440 for the active P1 TCP flows, appliance 108 can maintain and/or increase P1 traffic throughput and improve user experience by promoting system speed and stability. When P1 flows experience congestion, appliance 108 can be configured to not inflate the congestion window as inflating the congestion window can cause more congestion for P1 traffic and more P1 packets being dropped.

Figure 5:
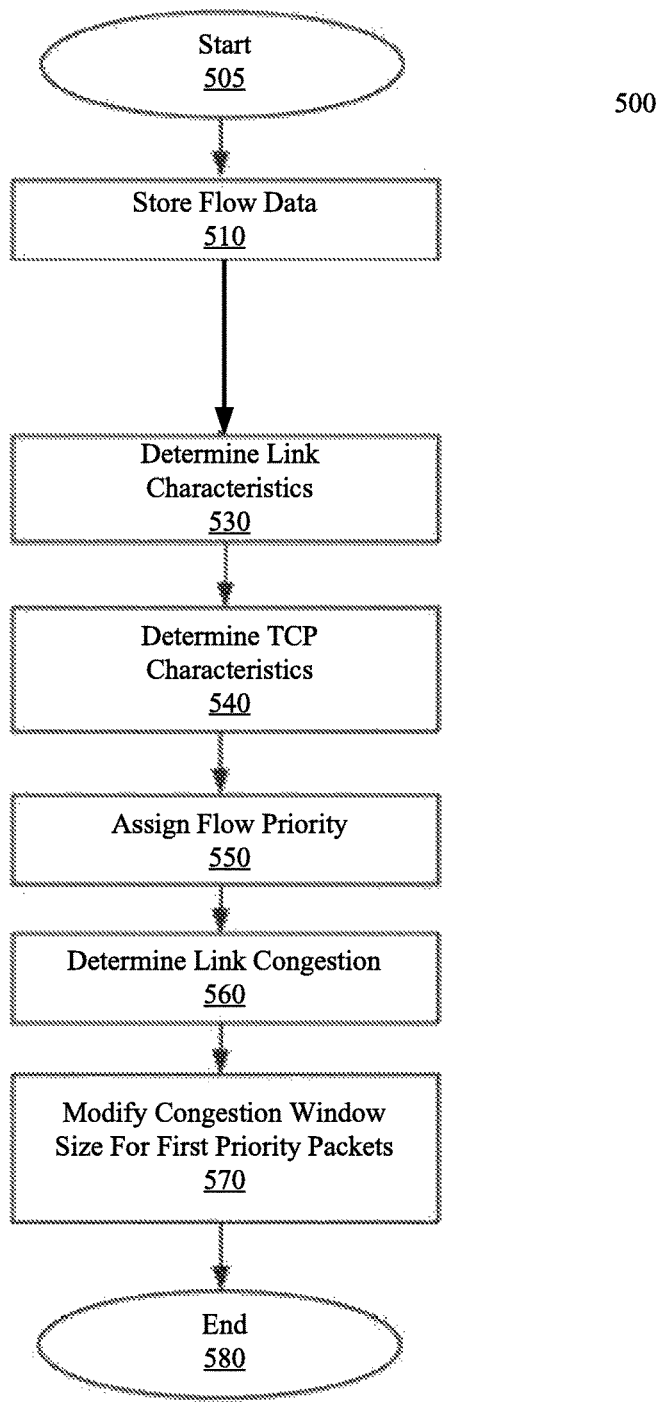
FIG. 5 is a flowchart representing an exemplary method of modifying a flow, consistent with embodiments of the present disclosure.

FIG. 5 is a flowchart representing an exemplary method 500 for modifying a flow, consistent with embodiments of the present disclosure. It will be readily appreciated that the illustrated procedure can be altered to delete steps or further include additional steps. While method 500 is described as being performed by an appliance (e.g., appliance 108), it is appreciated that method 500 can be performed by other devices alone or in combination with the appliance. After an initial start step 505, appliance 108 sends and receives a plurality of data packets comprising an active flow that are operating across a link between two link terminals (e.g., between appliance 108 and appliance 108'). At step 510, appliance 108 can acquire and store information regarding the active flow to an operatively connected computer-readable memory (e.g., memory 222).

Figure 6:
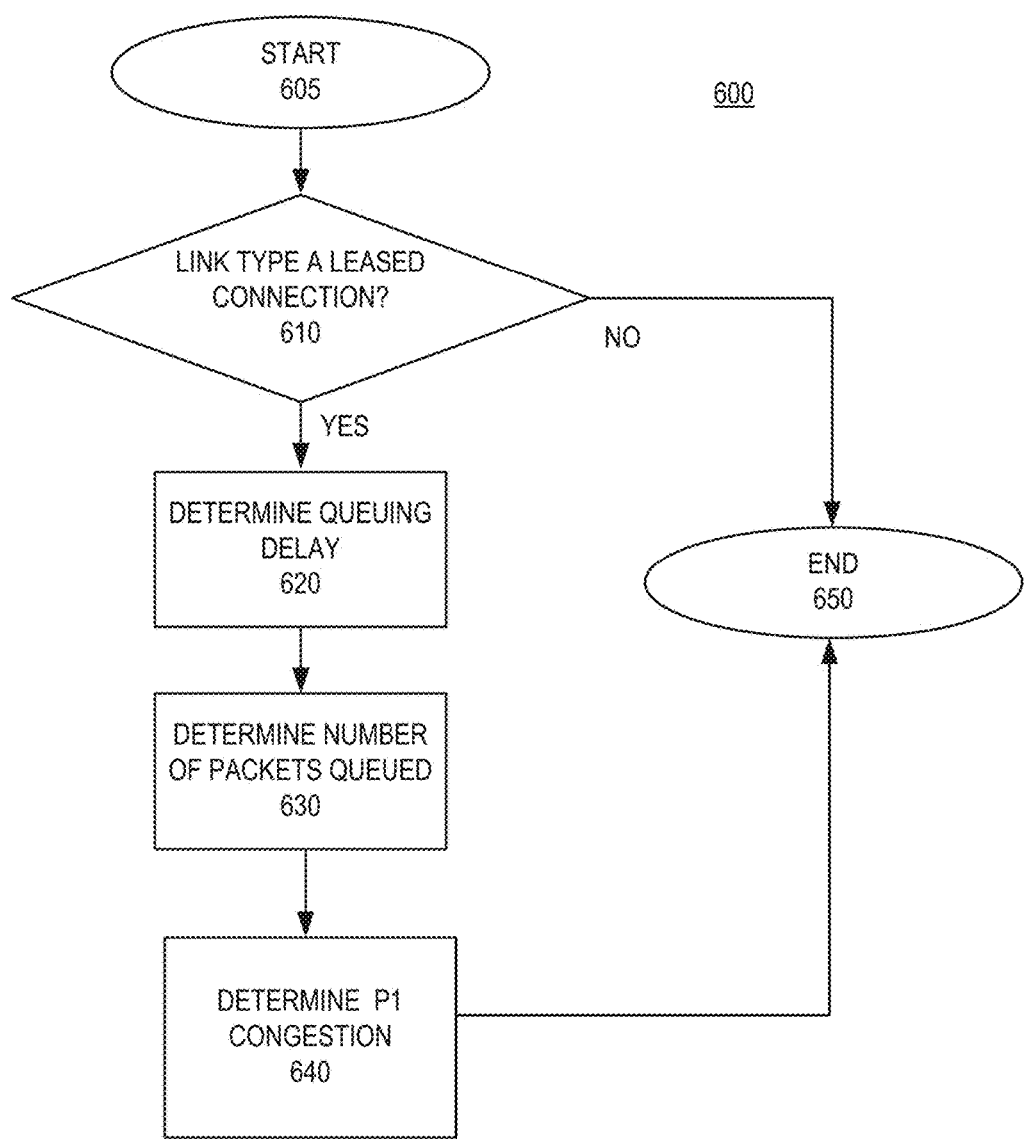
FIG. 6 is a flowchart representing an exemplary method of determining a TCP characteristic, consistent with embodiments of the present disclosure.

According to some embodiments, appliance 108 can also determine link characteristics indicative of the link across which the active flows are operating (step 530). The link can be, for example, a broadband link, a dedicated leased-line link between two dedicated apparatuses (e.g., appliance 108 and appliance 108'), and/or other types of links across which active flow 450 operates. Link characteristics can include information indicative of the link (e.g., link type 412) and/or bandwidth information (e.g., bandwidth 413). It is contemplated that appliance 108 can acquire link characteristics using network traffic detector 330, or any other operatively configured module on the appliance, According to some embodiments, appliance 108 can determine TCP characteristics (step 540) based on the stored flow data. FIG. 6 considers an exemplary method 600 for determining TCP characteristics (e.g., TCP characteristics 430).

Referring now to FIG. 6, an exemplary method 600 for determining TCP characteristics is described, consistent with embodiments of the present disclosure. After an initial starting step 605, appliance 108 can determine information about the link type, determine information about the flow, and determine aspects of the TCP traffic and operation of the TCP link. For example, at step 610, appliance 108 can determine, based on the link characteristics, whether the active link is a "leased" (proxied) type connection between known end points. If appliance 108 determines that the link type is not a leased connection, method 600 terminates at step 650. If the link type is a leased line type link, method 600 can proceed to step 620. In some embodiments, determination step 610 may not be included as the end points between the leased link are already known.

According to some embodiments, at step 620, appliance 108 determines a queuing delay ($d_q$) for the packets sent and received for flow 450. A value for $d_q$ is determined by:

$$d_q = RTT_{current} - RTT_{low} \text{ for } d_q > 0,$$

where $RTT_{current}$ is the round trip time currently experienced for a particular flow, and $RTT_{low}$ is the shortest round trip time experienced by the plurality of packets sent and received by TCP controller 320 during the predetermined time interval. Appliance 108 calculates values for $d_q$ for each of a plurality of active P1 flows. While the determination of the queuing delay can involve a calculation (as shown above), it is appreciated that the determination can involve other mechanisms. According to some embodiments, appliance 108 also determines the approximate number of packets queued for each particular flow for a maximum segment size (MSS), where:

$$\text{the number of packets queued} = (B*d_q)/MSS,$$

where B is bandwidth. While the determination of the approximate number of packets queued can involve a calculation (as shown above), it is appreciated that the determination can involve other mechanisms. At step 640, appliance 108 determines whether a P1 TCP connection is congested, and the method can end (650).

Referring again to FIG. 5, after appliance 108 determines TCP characteristics 430 and link characteristics, appliance 108 can assign one or more flow priorities at traffic prioritization module 324 (step 550), which are fed back to traffic priority controller 322. Traffic priority controller 322 can determine link congestion (step 560) for the active TCP link using the values for $d_q$, and the number of packets queued. For example, if the queuing delay or the number of packets queued in the network for a P1 flow is high, (e.g., greater than a threshold congestion value of 100 packets), appliance 108 can determine that early congestion is imminent for the P1 flow. When early congestion is detected for P1 traffic, it means a P1 packet drop could occur in the near future. Since the network link would be occupied with more of P1 traffic, the probability that the packet drop would occur for the P1 traffic tends to be much higher than the probability of packet drop for non-P1 traffic. Although a threshold congestion value is described herein as being 100 packets, it should be appreciated that the threshold congestion value could be any predetermined number of packets according to the particular requirements for network traffic throughput.

According to some embodiments, after appliance 108 has determined that there is congestion for P1 traffic, appliance 108 can cease the P1 congestion window inflation. According to some embodiments, after appliance 108 has determined that there is no congestion for P1 traffic, at step 570, appliance 108 can determine a modified congestion window size ("$cwnd_{modified}$"). A value for $cwnd_{modified}$ can be determined by:

$$cwnd_{modified} = cwnd *(1+\alpha/(\text{priority no.})) \text{ while priority no.} \geq (\text{total available priorities})/2, \text{ for } 0<\alpha<1,$$

where cwnd is congestion window 440, and priority no. is a relative number of priority from 1 to n, with 1 being the highest relative priority, and n being the lowest relative priority. While the determination of modified congestion window 470 can involve a calculation (as shown above), it is appreciated that the determination can involve other mechanisms, such as using a look-up table based on inputs flow priority 460 and TCP characteristics 430.

FIG. 7 is a table depicting an exemplary implementation of a modified flow, consistent with embodiments of the present disclosure. According to some embodiments, appliance 108 can evaluate a congestion window size for first priority (P1) packets, followed by second priority packets (P2), third priority packets (P3), etc. Referring now to FIG. 7, priority 710 represents an exemplary relative priority for each data flow. For example, assume that appliance 108 determines that congestion window 440 (that is, all congestion windows for all the different priority flows) is 100 packets. Based on the exemplary formula $cwnd_{modified} = cwnd*(1+\alpha/(\text{priority no.}))$ where $\alpha=0.6$, appliance 108 can determine a modified congestion window size of 160 packets for first priority P1 connection. Appliance 108 can determine that the second priority P2 congestion window is 100 packets, but can inflate the window to 130 packets. Appliance 108 evaluates each respective priority 710 accordingly.

To illustrate, in the following simplified example there will be only P1 and P2 traffic and the traffic priority ratio between P1 and P2 traffic will be 3:1 (assuming that there are enough packets to send, such that P1 traffic would send 3 packets into the network and P2 traffic would send 1 packet into the network.

According to conventional methods, typical TCP flow in the slow start phase generally increases an initial congestion window from 1 (round trip time number 1), to 2 (round trip time number 2), 4 (round trip time number 3), 8 (round trip time number 4), etc. Accordingly, as practiced conventionally, throughput ratio between P1 and P2 traffic would increase at a similar rate as well (e.g., 1:1 at round trip number 1, 2:2 at round trip number 2, 4:4 at round trip number 3, etc.). An example table below is illustrated, where packets sent out from QoS engine would be read from right to left (e.g., P2(1)→P1(3) indicates that 3 packets of P1 traffic is sent before 1 packet of P2 traffic is sent):

| RTT No. | P1 cwnd | P2 cwnd | Packets sent out from QoS (in order). | Throughput ratio P1:P2 Packets/RTT |
|---|---|---|---|---|
| 1 | 1 | 1 | P2(1)→P1(1) | 1:1 |
| 2 | 2 | 2 | P2(1)→P2(1)→P1(2) | 2:2 |
| 3 | 4 | 4 | P2(1)→ P2(1)→ P2(1)→P1(1)→P2(1)-> P1(3). | 4:4 |
| 4 | 8 | 8 | P2(1)→ P2(1)→P2(1)→ P2(1)→P2(1)→ P2(1)→P1(2)→ P2(1)→ P1(3)→P2(1)→ P1(3) | 8:8 |

With respect to the table above, it is apparent that the throughput ratio of P1 and P2 connection is almost similar, except that there is a negligible increase in throughput gain for P1 traffic since the QoS traffic priority module would schedule P1 traffic before the P2 traffic. It is also apparent, that if the traffic priority ratio is increased to a larger number such as 4:1 or 5:1, conventional methods may not provide any considerable throughput gain for P1 traffic.

By way of comparison, the embodiments described herein increase the throughput gains for higher priority traffic. Using the simplified example above and an exemplary value $\alpha=0.5$, the throughput gains for P1 traffic have been increased:

| RTT No. | P1 cwnd | P2 cwnd | P1 cwnd$_{modified}$ = cwnd * (1 + $\alpha$) | P2 cwnd$_{modified}$ = cwnd | Packets sent out from QoS (in order) | Throughput ratio P1:P2 Packets/RTT |
|---|---|---|---|---|---|---|
| 1 | 1 | 1 | 1 * 1.5 = 1.5 = 2 | 1 | P2(1)→P1(2) | 2:1 |
| 2 | 2 | 2 | 2 * 1.5 = 3 | 2 | P2(1)→P2(1)→P1(3) | 3:2 |
| 3 | 4 | 4 | 4 * 1.5 = 6 | 4 | P2(1)→ P2(1)→ P2(1)→ P1(3)→ P2(1)→ P1(3) | 6:4 |
| 4 | 8 | 8 | 8 * 1.5 = 12 | 8 | P2(1)→P2(1)→ P2(1)→P2(1)→P2(1)→ P1(3)→ P2(1)→P1(3)→P2(1)→ P1(3)→ P2(1)→P1(3) | 12:8 |

Over a period of time and over multiple round trip time numbers, the embodiments described herein may we might eventually reach the 3:1 traffic priority ratio. According to this example, it is shown congestion window reaches up to 8 packets only. However, as the TCP window eventually grows as the TCP state moves from the slow start phase to the congestion avoidance phase, traffic priority controller module 322 can then attain a ratio of 3:1 more quickly than a conventional connection and achieve better throughput for P1 traffic.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. An appliance, comprising:
a transport layer controller configured to:
acquire link characteristics of a link employing a Transmission Control Protocol ("TCP"),
determine a congestion window for a flow of a plurality of data packets over the link, and
determine transport layer characteristics for the flow;
a traffic priority controller configured to:
acquire a flow priority of the flow, where the flow priority is one of a plurality of flow priorities assigned to a plurality of flows;
determine whether congestion for the flow is going to occur using the transport layer characteristics and the link characteristics;
if a determination is made that congestion for the flow is not going to occur, perform congestion window size inflation operations comprising:
dynamically determining a new value for a variable size of the congestion window exclusively when the flow priority is a priority other than a lowest priority, the new value being greater than a current value of the congestion window's variable size and determined based on the flow priority of the flow, and
increasing the variable size of the congestion window from the current value to the new value; and
a quality of service engine configured to output the flow according to the congestion window with the increased size:,
wherein amounts of congestion window inflation for the plurality of flows are different based on the plurality of flow priorities, respectively.

2. The appliance of claim 1, wherein the flow priority is a first priority that has been indicated as a high priority, wherein one or more other priorities have not been indicated as being a high priority.

3. The appliance of claim 2, wherein the congestion window associated with the first priority is larger than a congestion window associated with the one or more other priorities.

4. The appliance of claim 1, wherein one or more other priorities have not been indicated as being a high priority, and wherein a congestion window associated with the first priority is larger than a congestion window associated with a second priority.

5. The appliance of claim 1, further comprising a traffic prioritization module configured to assign a flow priority to the flow and to provide the flow priority to the traffic priority controller.

6. The appliance of claim 1, wherein the traffic priority controller is further configured to acquire link characteristics from the transport layer controller, wherein the link characteristics include a bandwidth over the link.

7. The appliance of claim 6, wherein the traffic priority controller is further configured to acquire transport layer characteristics from the transport layer controller, wherein the transport layer characteristics include round trip time of some packets of the flow.

8. The appliance of claim 7, wherein the traffic priority controller is configured to determine whether congestion is occurring or is going to occur based on the traffic priority controller being further configured to:
determine a queuing delay based on the round trip time of some packets of the flow;

determine a number of packets queued using the queuing delay and the bandwidth; and evaluate the number of packets queued using a threshold congestion value.

9. A method for optimizing network traffic, comprising:

acquiring link characteristics of a link employing a Transmission Control Protocol ("TCP");

determining a congestion window for a flow of a plurality of data packets over the link;

determining transport layer characteristics for the flow;

assigning a flow priority of the flow;

determining whether congestion for the flow is going to occur using the transport layer characteristics and the link characteristics; and in response to a determination that the congestion for the flow is not going to occur, performing congestion window size inflation operations comprising:

dynamically determining a new value for a variable size of the congestion window exclusively when the flow priority is a priority other than a lowest priority, the new value being greater than a current value of the congestion window's variable size and determined based on a flow priority for the flow, and increasing the variable size of the congestion window from the current value to the new value;

wherein amounts of congestion window inflation for a plurality of flows are different based on priorities assigned to the plurality of flows, respectively.

10. The method of claim 9, wherein the flow priority is a first priority that has been indicated as a high priority, wherein one or more other priorities have not been indicated as being a high priority.

11. The method of claim 10, wherein the congestion window associated with the first priority flow is larger than a congestion window associated with the one or more other priorities.

12. The method of claim 9, wherein one or more other priorities have not been indicated as being a high priority, and wherein a congestion window associated with the first priority is larger than a congestion window associated with a second priority.

13. The method of claim 12, further comprising:

determining whether congestion is or going to occur, wherein the determination includes:

determining a queuing delay based on a round trip time of some packets of the flow;

determining a number of packets queued using the queuing delay and a bandwidth; and evaluating the number of packets queued using a threshold congestion value.

14. The method of claim 9, further comprising acquiring link characteristics from the transport layer controller, wherein the link characteristics include a bandwidth over the link.

15. The method of claim 14, further comprising acquiring transport layer characteristics from the transport layer controller, wherein the transport layer characteristics include round trip time of some packets of the flow.

16. The method of claim 15, further comprising determining whether congestion is occurring or is going to occur, wherein the determination includes:

determining a queuing delay based on the round trip time of some packets of the flow;

determining a number of packets queued using the queuing delay and the bandwidth; and evaluating the number of packets queued using a threshold congestion value.

17. A non-transitory computer readable storage medium that stores a set of instructions that are executable by at least one processor of an appliance to cause the appliance to perform a method for optimizing network traffic, the method comprising:

acquiring link characteristics of a link employing a Transmission Control Protocol ("TCP");

determining a congestion window for a flow of a plurality of data packets over the link;

determining transport layer characteristics for the flow;

assigning a flow priority of the flow, where the flow priority is one of a plurality of flow priorities assigned to a plurality of flows;

determining whether congestion for the flow is going to occur using the transport layer characteristics and the link characteristics; and in response to a determination that the congestion for the flow is not going to occur, performing congestion window size inflation operations comprising dynamically determining a new value for a variable size of the congestion window exclusively when the flow priority is a priority other than a lowest priority, the new value being greater than a current value of the congestion window's variable size and determined based on the flow priority of the flow, and increasing the congestion window's variable size from the current value to the new value;

wherein amounts of congestion window inflation for the plurality of flows are different based on the plurality of flow priorities, respectively.

18. The non-transitory computer readable storage medium of claim 17, wherein the flow priority is a first priority that has been indicated as a high priority, wherein one or more other priorities have not been indicated as being a high priority.

19. The non-transitory computer readable storage medium of claim 18, wherein the congestion window associated with the first priority is larger than a congestion window associated with the one or more other priorities.

20. The non-transitory computer readable storage medium of claim 19, wherein the set of instructions that are executable by the at least one processor of the appliance to cause the appliance to further perform:

determining a queuing delay based on a round trip time of some packets of the flow;

determining a number of packets queued using the queuing delay and a bandwidth; arid evaluating the number of packets queued using a threshold congestion value.

21. The appliance of claim 1, wherein the increase in congestion window for the flow is further based on a congestion window size of the congestion window.

* * * * *